United States Patent Office 3,309,101
Patented Mar. 14, 1967

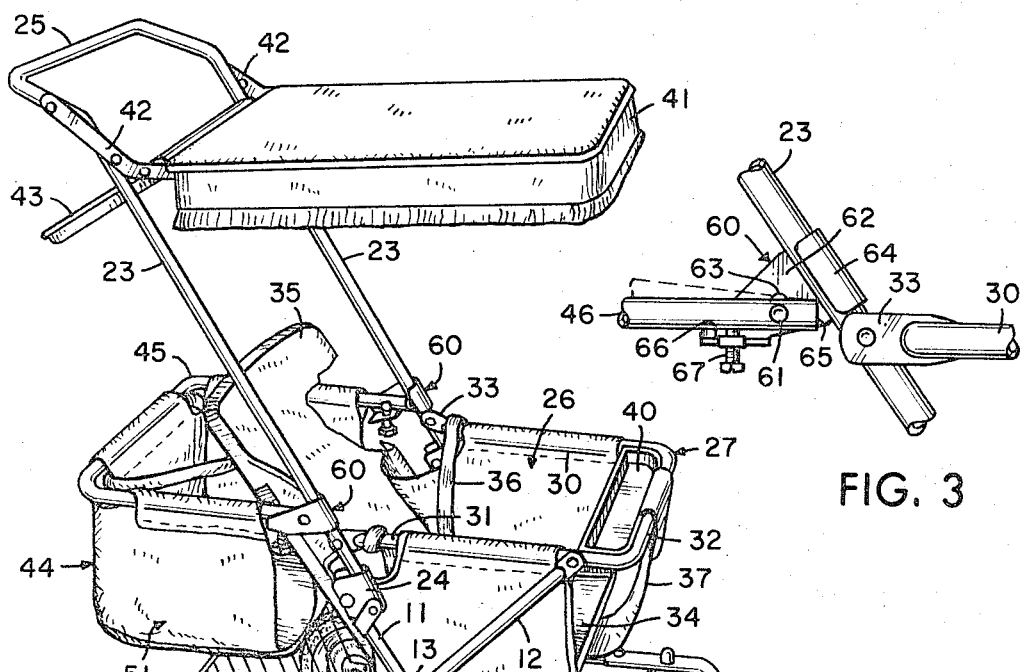
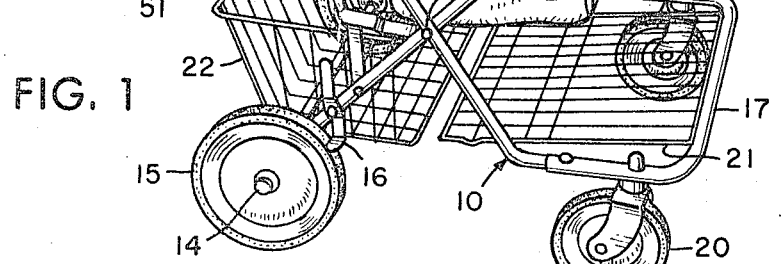
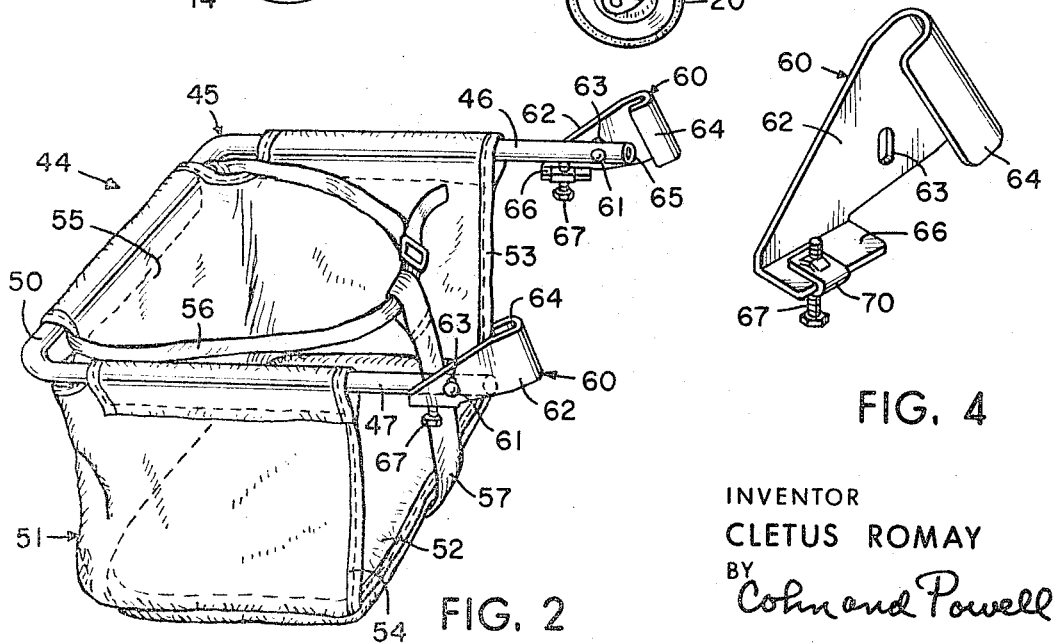

3,309,101
TANDEM TWO-SEAT STROLLER
Cletus Romay, St. Louis, Mo., assignor to Welsh Co., St. Louis, Mo., a corporation of Missouri
Filed Feb. 8, 1965, Ser. No. 430,810
8 Claims. (Cl. 280—47.38)

This invention relates generally to improvements in an auxiliary child's seat and in a stroller incorporating such seat, and more particularly to the clamping mechanism possessed by the auxiliary seat and to the disposition and connection of the seat in a stroller that already has one seat structure.

In the conventional stroller, the primary child's seat is carried by the stroller frame and is located between and substantially forwardly of the pusher handles. It is an important objective to provide an auxiliary seat that can be selectively and conveniently attached to and carried by the pusher handles, and which is located in tandem immediately behind the primary seat. The usual single seat stroller can be converted to a tandem two-seater when desired, by the use of this auxiliary seat.

An important object is realized by the provision of a bracket that is pivotally connected to each side arm of a seat frame of the auxiliary seat means, the bracket including a portion that is spaced from the end of the side arm to receive a pusher handle therebetween, the handle being clamped between the bracket portion and the arm end as the auxiliary seat frame is pivotally moved to its operative position behind the primary seat means.

Another important object is afforded by the provision of a ledge on the bracket extending under the side arm of the auxiliary seat frame, whereby to support the frame in its operative position in which the auxiliary seat can carry a child, as the seat frame is pivotally adjusted to clamp the pusher handle between a bracket flange and arm end.

Still another important object is attained by the provision of an adjustment means carried by the bracket and supporting the auxiliary seat frame in its operative position, the adjustment means being adapted to raise or lower the auxiliary seat frame about its pivot connection so as to accommodate the peripheral size of the pusher handle and to maintain the frame in a suitable disposition for seating a child.

An important advantage is provided in that a threaded member, constituting the adjustment means, is carried by the ledge and engages the side arm of the auxiliary seat frame in supporting relation, the threaded member being selectively adjustable to raise or lower the side arm about its pivot connection to the bracket, whereby the previously described functions are realized.

An important object is achieved in that the pivot connection between the side arm of the auxiliary seat frame and its associated bracket can shift automatically in a direction toward or away from the pusher handle upon wedging the handle between the arm end and bracket flange as the auxiliary seat frame is moved about such pivot connection, whereby the distance between the arm and the bracket flange will vary to accommodate the specific size of the handle wedged therebetween.

The provision of the adjustment means carried by the bracket ledge enables the auxiliary seat frame to be located in the desired operative position by compensating for the adjustable movement of the pivot connection upon accommodation of the bracket flange and arm end to the pusher handle size.

Another important object is afforded by the utilization of a stroller in which the seat frame defining the primary seat means includes side arms that are attached to the pusher handles so that such side arms constitute stops that abut the brackets of the auxiliary seat means upon attachment, whereby to locate the primary and auxiliary seat in tandem.

It is an important objective to provide an auxiliary child's seat for a stroller that is simple and durable in construction, economical to manufacture and assemble, efficient in operation, adapted for existing, conventional strollers now on the market, and which can be readily attached and detached from such stroller by anyone with little or no instruction.

FIG. 1 is a perspective view of a stroller on which an auxiliary seat is carried in tandem behind the primary seat;

FIG. 2 is a perspective view of the auxiliary seat;

FIG. 3 is a fragmentary, enlarged side elevational view of the connection of the auxiliary seat to one of the pusher handles, and FIG. 4 is a perspective view of the bracket carried by the auxiliary seat frame.

Referring now by characters of reference to the drawings, and first to FIG. 1, a child's stroller will be described. This stroller includes a main frame generally indicated at 10 having frame elements 11 and 12 at each side pivotally interconnected substantially midway by pivot connection 13 to provide a substantially X-shaped structure. The lower rear ends of frame element 12 at opposite sides of the main frame 10 carry a transverse axle 14 on which are mounted a pair of ground wheels 15. A brake 16 is pivotally mounted on the frame element 12 at one side of the main frame 10, such brake 16 frictionally engaging the tread of the ground wheel 15 at the same side of the stroller to preclude rotation of such ground wheel 15, and hence preclude selectively unintentional or accidental rolling of the stroller.

The lower front ends of the frame element 11 at opposite sides of the main frame 10 are interconnected by a substantially U-shaped deck frame 17. A pair of ground wheels 20 are carried by the deck frame 17, the wheels 20 having a swivel connection to facilitate turning, pushing, pulling and otherwise manipulating the stroller.

Attached to and carried by the deck frame 17 is a footrest 21 that extends rearwardly of the deck frame 17 between the X-shaped frame elements 11–12 of the main frame 10.

In the embodiment disclosed, a wire basket 22 is disposed between the X-shaped frame elements 11–12 of the main frame 10 immediately over the ground wheel axle 14.

A pair of pusher handles 23 are attached to the upper rear ends of the frame elements 11 at opposite sides of the main frame 10 by fastening plates 24. The pusher handles 23 extend upwardly and rearwardly from the main frame 10. As is usual, the pusher handles 23 are integrally connected by a transverse grip portion 25.

A primary seat means generally referred to by 26 is carried by the main frame 10 between the X-shaped frame elements 11 and 12 at opposite sides of such main frame 10. Specifically, the primary seat means 26 includes a U-shaped seat frame 27 having side arms 30 and 31 integrally connected by a front crossbar 32. The ends of the side arms 30 and 31 are pivotally connected to the pusher handles 23, the arm ends constituting stops 33, the purpose and function of which will be described fully upon later description of parts. A flexible seat 34 constructed preferably of a canvas material is carried by the side arms 30 and 31 of the seat frame 27. A back rest 35 is attached to and carried by the seat 34.

A safety strap 36 extends between the side arms 30 and 31 of the seat frame 27, the safety strap 36 being adapted to be tightened across the body of the child to hold such child within the primary seat means 26.

A center strap 37 attached to and extending upwardly from the front edge of the canvas seat 34 is attached to the crossbar 32. This center strap 37 fits between the legs of the child while seated in the primary seat means 26 to prevent such child from slipping out of the front end of such seat means.

For the convenience of the child, a tray 40 is carried by and between the seat frame 27 immediately adjacent the front crossbar 32.

Disposed over the primary seat means 26 is a sunshade 41, the sunshade 41 being attached to the upper ends of the pusher handles 23 by rods 42. A rear sunshade 43 is hingedly connected to and carried by the rods 42 immediately behind the front sunshade 41.

As is seen in FIG. 1, an auxiliary seat means generally indicated by 44 is selectively attached to the pusher handles 23, and is located in tandem immediately behind the primary seat means 26. The detailed construction of this auxiliary seat means 44 is best shown in FIG. 2.

From FIG. 2, it is seen that the auxiliary seat means 44 includes a U-shaped seat frame generally referred to by 45 having spaced side arms 46 and 47 integrally interconnected by a rear crossbar 50. A seat 51 preferably constructed of a canvas material is attached to and carried by the seat frame 45, the seat 51 including a bottom 52, side portions 53 and 54 looped over and attached to the side arms 46 and 47 respectively, and a rear portion 55 looped over and attached to the rear crossbar 50.

A safety strap 56 is attached to the rear crossbar 50 in the canvas loop with the rear seat portion 55, the safety strap 56 being adapted to circumvent the body of a child placed in the seat means 44 in order to hold the child securely in the seat. A center strap 57 is secured to the bottom 52 of the seat 51 and extends upwardly for attachment to the safety strap 56. The center strap 57 is adapted to interfit between the legs of the child seating within the seat means 44 to prevent such child from slipping out of the front of such seat means 44.

A bracket generally referred to by 60 is pivotally interconnected to each seat frame arm 46 and 47 by a pivot pin 61. Because the brackets 60 are identical, but of reverse construction, a detailed description of one bracket will suffice for the other. Moreover, the attachment of each bracket 60 to a pusher handle 23 is the same so that description of one attachment will suffice for the other.

From FIG. 4, it is seen that the bracket 60 includes a side portion 62 having a slot 63 through which the pivot pin 61 slidably extends. The bracket 60 includes a reversely bent, curvilinear flange 64 adapted to embrace and receive the pusher handle 23. As will be apparent from FIG. 3, the bracket flange 64 is spaced forwardly of the end 65 of the side arm 46 so as to receive the pusher handle 23 therebetween. Upon relative pivotal movement of the side arm 46 and bracket 60 about pivot pin 61, the arm end 65 will engage the pusher handle 23 and wedge the handle 23 between the arm end 65 and bracket flange 64. In this manner, the auxiliary seat frame 45, and hence the auxiliary seat 44, is secured to and carried by the pusher handles 23 of the main frame 10 and is located in tandem behind the primary seat means 26.

The bracket 60 includes an inturned ledge 66 extending underneath and in supporting relation to the side arm 46 rearwardly of the pivot pin 61. A threaded screw 67 extends through the bracket ledge 66 and threadedly engages a U-shaped clip 70 placed over the ledge 66, the threaded screw 67 constituting an adjustment means that engages and supports the frame arm 46. As is indicated in FIG. 3, the screw 67 can be threadedly adjusted to raise or lower the seat frame arm 46 about the pivot axis defined by pin 61 in order to locate the seat frame 45 in substantially a horizontal plane which is the preferred operative position to carry a child within the auxiliary seat means 44.

The bracket slot 63 extends generally in a direction toward and away from the pusher handle 23 retained by the bracket 60 between the bracket flange 64 and arm end 65. This structural arrangement enables the pivot pin 61 to slide within its cooperating slot 63 in order to accommodate the specific size of the pusher handle 23 located between the arm end 65 and bracket flange 64 as the side arm 46 is moved about its pivot connection toward the ledge 66. Thus it is seen that the pivot pin 61 will automatically find its appropriate adjusted position within its associated bracket slot 63 as the pusher handle 23 is clamped between the arm end 65 and bracket flange 64, and that the screw 67 can be adjusted to bring the seat frame 45 to the desired horizontal plane and thereby compensate for any angular disposition of the auxiliary seat frame 45 caused by the adjustment the pivot pin 61 within its bracket slot 63.

It is thought that the usage and functional advantages of the auxiliary child's seat 44 has become fully apparent from the foregoing detailed description of parts, but for completeness of disclosure the usage with a child's stroller will be briefly described. It will be assumed that the brackets 60 are attached to and carried by the side arms 46 and 47 of the auxiliary seat frame 45, as is illustrated in FIG. 2. It will be further assumed that the stroller has been operatively expanded as is disclosed in FIG. 1 and that there is a need for utilizing the stroller to carry two children instead of one. As is conventional, one child is placed in the primary seat means 26. The auxiliary seat means 44 is attached in tandem behind the primary seat means 26 to seat a second child.

To attach the auxiliary seat means 44, the reversely bent bracket flanges 64 are located about the pusher handles 23. The auxiliary seat frame 45 is held in an upwardly inclined position relative to the usual horizontal plane so as to keep the arm ends 65 out of clamping engagement with the pusher handles 23 located between the arm ends 65 and the bracket flanges 64. The brackets 60 are slid downwardly along the pusher handles 23 until the bracket flanges 64 abut the stops 33, the stops 33 automatically positioning the brackets 60 on the pusher handles 23. Then, the auxiliary seat frame 45 is swung downwardly about the pivot pins 61 to allow the arm ends 65 to engage the pusher handles 23 and thereby wedge such handles 23 between the arm ends 65 and the bracket flanges 64. This wedging action clamps the brackets securely in place on the pusher handles 23.

Depending upon the peripheral size of the pusher handles 23, the pivot pins 61 will move slidably and adjustably within their associated bracket slots 63 to enable such clamping engagement of the arm ends 65 with the handles 23, and thereby accommodate the handle size. As the auxiliary seat frame 45 is swung downwardly toward the bracket ledges 66, the side arms 46 and 47 will be supported on the threaded screws 67. The screws 67 are threadedly adjusted, if needed, to raise or lower the auxiliary seat frame 45 about its pivot connection to bring the auxiliary seat frame 45 substantially to the desired, operative horizontal frame which defines the auxiliary seat position best suited to carry a child.

The combination of the manual adjustments of the screws 67 and the automatic adjustments of the pivot pins 61 within their associated bracket slots 63 affords the desired result of first, clamping the pusher handles 23 securely between the arm ends 65 and the bracket flanges 64 while accommodating the handle size, and secondly, maintaining the auxiliary seat in the desired position to carry a child.

The auxiliary seat means 44 is now securely attached to and carried by the stroller in tandem immediately behind the primary seat means 26. Thus, the stroller has been converted into a two-seater in which the weight of each child is primarily supported by the main stroller frame 10 between the X-shaped side frame elements 11 and 12. It is this tandem relationship of the primary and auxiliary seats 26 and 44 and the particular connection of such auxiliary seat 44 to the pusher handles 23 of the main frame 10 which provides a highly stable stroller construction.

Because the auxiliary seat means 44 can be sold as an accessory for various types of strollers presently on the market, it is seen that there must be some provision in the attachment means to accommodate different diameters of the pusher handles. It will be understood that in different makes of strollers, pusher handles 23 of various diameters are utilized. The present brackets 60 and their pivotal connections with the side arms 46 and 47 of the auxiliary seat frame 45 achieve this advantageous result as has been fully explained.

When the need for a two-seat stroller no longer exists, the auxiliary seat means 44 can be quickly and easily detached to convert the stroller back to the conventional single seat construction. To detach, the auxiliary seat means 45 is swung upwardly about its pivot connections to the brackets 60 in a direction to raise the side arms 46 and 47 off of their supporting screws 67. As the auxiliary seat frame 45 is raised, the arm ends 65 will operatively disengage the pusher handles 23, and release the handles 23 so that they can be removed from between the arm ends 65 and the bracket flanges 64. The stroller is now conditioned for use as a single seater. The auxiliary seat means 44 can be advantageously collapsed and stored for subsequent use.

Although the invention has been described by making detailed reference to a single preferred embodiment, such detail is to be understood in an instructive, rather than in any restrictive sense, many variants being possible within the scope of the claims hereunto appended.

I claim as my invention:

1. A child's seat adapted for attachment to a support member, comprising:
   (a) a frame including side arms,
   (b) a seat carried by the frame,
   (c) a bracket having a flange extending outwardly therefrom pivotally connected to each side arm,
   (d) the bracket flange and the end of the side arm providing a space therebetween to receive the support member, the bracket and side arm being relatively pivoted to reduce the space and to clamp the support member between the bracket and the end of the side arm, and
   (e) adjustable means interconnecting the bracket and side arm to adjust the space between the bracket and the end of the side arm for accommodation of the support member and to maintain the frame in position to carry a child in the seat.

2. A child's seat adapted for attachment to a support member, comprising:
   (a) a frame including side arms,
   (b) a seat carried by the frame,
   (c) a bracket having a flange extending outwardly therefrom pivotally connected to each side arm,
   (d) the bracket flange and the end of the side arm providing a space therebetween to receive the support member, the bracket and side arm being relatively pivoted to reduce the space and to clamp the support member between the bracket and the end of the side arm,
   (e) the bracket including a ledge under the side arm, and
   (f) a threaded member carried by the ledge and engaging the side arm in supporting relation, the threaded member being adjustable to raise or lower the side arm about its pivot connection to the bracket so as to maintain the frame in position to carry a child.

3. A child's seat adapted for attachment to a support member, comprising:
   (a) a frame including side arms,
   (b) a seat carried by the frame,
   (c) a bracket including a side portion adjacent a portion of each side arm and a flange extending outwardly from said bracket, one of said portions being provided with an elongate slot extending generally in a direction toward and away from the support member received between the bracket and the side arm,
   (d) a pivot pin carried by the other said portion and extending through the slot to interconnect the bracket and side arm pivotally,
   (e) the bracket and side arm being relatively pivoted to clamp the support member between the side arm and bracket flange,
   (f) the pin shifting in the elongate slot to accommodate the peripheral size of the support member.

4. A child's seat as defined in claim 3, in which:
   (h) the bracket includes a ledge extending under the side arm, and
   (i) adjustable means carried by the ledge supporting the side arm and selectively raising or lowering the side arm about its pivot connection to maintain the frame in position to carry a child in the seat and compensate for any movement of the pivot pin in the slot during clamping of the support member between the bracket and side arm.

5. In a child's stroller:
   (a) a frame,
   (b) a primary seat means carried by the frame,
   (c) a pair of pusher handles extending rearwardly from the frame and from the primary seat means,
   (d) an auxiliary seat means including a seat frame having side arms,
   (e) a seat carried by the seat frame, and
   (f) a bracket connecting each side arm to one of the pusher handles to position and carry the auxiliary seat means in tandem behind the primary seat means,
   (g) the bracket being pivotally connected to the associated side arm, the bracket having a flange extending outwardly therefrom,
   (h) the bracket flange and the end of the side arm providing a space therebetween to receive the associated pusher handle, the bracket and side arm being relatively pivoted to reduce the space and to clamp the handle between the bracket flange and the end of the side arm, and
   (i) the primary seat means includes a seat frame having side arms attached to the handles to provide stops, the brackets engaging the stops to position the auxiliary seat means on the handles behind the primary seat means.

6. In a child's stroller:
   (a) a frame, and a primary seat means carried by the frame,
   (b) a pair of pusher handles extending rearwardly from the frame and from the primary seat means, and
   (c) an auxiliary seat means including a seat frame having side arms,
   (d) a seat carried by the seat frame, and
   (e) a bracket connecting each side arm to one of the pusher handles to position and carry the auxiliary seat means in tandem behind the primary seat means,
   (f) the bracket including a portion adjacent a portion of the associated side arm, one of said portions being provided with an elongate slot, the bracket having a flange extending outwardly therefrom,
   (g) a pivot pin carried by the other said portion and extending through the slot to interconnect the bracket and side arm pivotally,
   (h) the elongate slot extending generally in a direction toward and away from the associated pusher handle so that the pin will shift in the slot to accommodate to the peripheral size of the pusher handle between the bracket and the side arm,
   (i) the bracket flange and side arm clamping the pusher handle therebetween upon relative pivotal movement of the bracket and side arm.

7. In a child's stroller:
   (a) a frame,
   (b) a primary seat means carried by the frame, (c) a pair of pusher handles extending rearwardly from the frame and from the primary seat means, and (d) an auxiliary seat means including a seat frame having side arms, (e) a seat carried by the seat frame, and (f) a bracket connecting each side arm to one of the pusher handles to position and carry the auxiliary seat means in tandem behind the primary seat means, (g) each bracket including a flange embracing the associated pusher handle, the flange being spaced from the end of the side arm to receive the handle therebetween, (h) the bracket including a portion adjacent a portion of the associated side arm, one of said portions being provided with an elongate slot, (i) a pivot pin carried by the other said portion and extending through the slot to interconnect the bracket and side arm pivotally, the elongate slot extending generally in a direction toward and away from the pusher handle so that the pin will shift in the slot to accommodate the size of the pusher handle upon clamping the handle between the end of the side arm and the bracket flange as the auxiliary seat frame is moved about its pivot connection, (j) the bracket including a ledge extending under the side arm, and (k) means carried by the ledge supporting the side arm, the supporting means being adjustable to raise or lower the side arm about its pivot connection so as to maintain the auxiliary seat frame in position to carry a child and compensating for the movement of the pivot pin in its slot upon accommodation to the size of the pusher handle.

8. A child's stroller as defined in claim 7, in which:

(1) the primary seat means includes a seat frame having side arms attached to the pusher handles to provide stops, the bracket flanges engaging the stops to position the auxiliary seat means on the handles behind the primary seat means.

References Cited by the Examiner

UNITED STATES PATENTS

| | | | |
|---|---|---|---|
| 123,122 | 1/1872 | Palmenberg | 248—122 |
| 2,163,859 | 6/1939 | Ver Bockel | 248—122 X |
| 2,435,733 | 2/1948 | Belyeu | 280—47.38 X |
| 2,499,007 | 2/1950 | Stadelman | 297—243 |
| 2,574,743 | 11/1951 | King. | |
| 2,605,778 | 8/1952 | Clapper | 248—122 X |
| 2,993,702 | 7/1961 | Gill | 297—243 X |
| 3,126,186 | 3/1964 | Halligan | 248—226 X |

BENJAMIN HERSH, *Primary Examiner.*

C. C. PARSONS, *Assistant Examiner.*